United States Patent
Konishi et al.

(10) Patent No.: US 11,971,426 B2
(45) Date of Patent: Apr. 30, 2024

(54) AUTOMATIC ANALYSIS DEVICE

(71) Applicant: Hitachi High-Tech Corporation, Tokyo (JP)

(72) Inventors: Rei Konishi, Tokyo (JP); Nobuhiko Sasaki, Tokyo (JP); Masahiko Iijima, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 123 days.

(21) Appl. No.: 16/646,824

(22) PCT Filed: Jan. 23, 2019

(86) PCT No.: PCT/JP2019/001965
§ 371 (c)(1),
(2) Date: Mar. 12, 2020

(87) PCT Pub. No.: WO2019/176296
PCT Pub. Date: Sep. 19, 2019

(65) Prior Publication Data
US 2020/0278366 A1  Sep. 3, 2020

(30) Foreign Application Priority Data
Mar. 16, 2018  (JP) .................. 2018-048756

(51) Int. Cl.
*G01N 35/10* (2006.01)
*B01L 3/02* (2006.01)
(Continued)

(52) U.S. Cl.
CPC .......... *G01N 35/1004* (2013.01); *B01L 13/00* (2019.08); *G01N 21/11* (2013.01);
(Continued)

(58) Field of Classification Search
CPC ............. G01N 35/1004; G01N 35/025; G01N 21/253; G01N 21/11; G01N 21/47;
(Continued)

(56) References Cited

U.S. PATENT DOCUMENTS

2004/0096983 A1  5/2004  Jacobs et al.
2006/0293200 A1  12/2006  Takayama et al.
(Continued)

FOREIGN PATENT DOCUMENTS

EP  0 769 547 A2  4/1997
JP  55-73283 U  5/1980
(Continued)

OTHER PUBLICATIONS

Translation of WO9904271A1, Kawamura, Toshimi, Jan. 28, 1999 (Year: 1999).*
(Continued)

*Primary Examiner* — Jill A Warden
*Assistant Examiner* — Henry H Nguyen
(74) *Attorney, Agent, or Firm* — Crowell & Moring LLP

(57) ABSTRACT

An automatic analysis device that avoids carryover and prevents deterioration of analysis performance without controlling reaction cell position is provided with: a reaction cell in which a sample and a reagent are mixed and allowed to react; a light source that radiates light onto the mixed liquid of the sample and the reagent; a detector that detects the light radiated from the light source; and a cleaning mechanism that cleans the reaction cell. The cleaning mechanism includes an intake nozzle that draws in liquid from the reaction cell and a discharge nozzle that discharges the liquid into the reaction cell; the intake nozzle and the discharge nozzle can move vertically; and the intake nozzle is cleaned by lowering the intake nozzle into the reaction cell, in which a cleaning liquid or cleaning water have been
(Continued)

accumulated, without drawing in the cleaning liquid or the cleaning water.

11 Claims, 8 Drawing Sheets

(51) Int. Cl.
  *G01N 21/11* (2006.01)
  *G01N 21/25* (2006.01)
  *G01N 21/47* (2006.01)
  *G01N 21/59* (2006.01)
  *G01N 35/02* (2006.01)
  *G01N 35/04* (2006.01)

(52) U.S. Cl.
  CPC ............ *G01N 21/253* (2013.01); *G01N 21/47* (2013.01); *G01N 21/59* (2013.01); *G01N 35/025* (2013.01); *B01L 3/0289* (2013.01); *B01L 2200/143* (2013.01); *B01L 2300/0803* (2013.01); *G01N 2021/115* (2013.01); *G01N 2035/0437* (2013.01); *G01N 2201/0415* (2013.01)

(58) Field of Classification Search
  CPC ............ G01N 21/59; G01N 2201/0415; G01N 2035/0437; G01N 2021/115; B01L 13/00; B01L 2200/143; B01L 2300/0803; B01L 3/0289
  See application file for complete search history.

(56) References Cited

U.S. PATENT DOCUMENTS

| | | | | |
|---|---|---|---|---|
| 2008/0102528 | A1* | 5/2008 | Xu | G01N 35/025 |
| | | | | 436/47 |
| 2009/0114255 | A1 | 5/2009 | Kato | |
| 2010/0092340 | A1 | 4/2010 | Inamura et al. | |
| 2010/0098590 | A1* | 4/2010 | Inamura | G01N 35/1016 |
| | | | | 324/663 |
| 2010/0254857 | A1 | 10/2010 | Mazume et al. | |
| 2010/0284862 | A1 | 11/2010 | Kakizaki et al. | |
| 2012/0318302 | A1* | 12/2012 | Nakayama | G01N 35/1004 |
| | | | | 134/26 |
| 2013/0255725 | A1* | 10/2013 | Mori | B01L 3/523 |
| | | | | 134/18 |
| 2015/0125940 | A1* | 5/2015 | Oguro | G01N 35/04 |
| | | | | 422/63 |
| 2015/0219679 | A1* | 8/2015 | Takeuchi | G01N 15/0606 |
| | | | | 422/64 |
| 2017/0153263 | A1 | 6/2017 | Mizuki | |
| 2020/0064364 | A1 | 2/2020 | Ito et al. | |

FOREIGN PATENT DOCUMENTS

| | | | | |
|---|---|---|---|---|
| JP | 8-313537 A | 11/1996 | | |
| JP | 11-352131 A | 12/1999 | | |
| JP | 2004-223352 A | 8/2004 | | |
| JP | 2005-28206 A | 2/2005 | | |
| JP | 2005-30769 A | 2/2005 | | |
| JP | 2008-161833 A | 7/2008 | | |
| JP | 2010-210643 A | 9/2010 | | |
| JP | 2014-206380 A | 10/2014 | | |
| WO | WO-9904271 A1 * | 1/1999 | ......... | G01N 35/1004 |
| WO | WO-2007132632 A1 * | 11/2007 | ............. | B01L 99/00 |
| WO | WO 2018/110146 A1 | 6/2018 | | |

OTHER PUBLICATIONS

Translation of JP2014206380A, Miyazaki, Masaru, Oct. 30, 2014 (Year: 2014).*
Translation of WO2007132632A1, KATO KO, Nov. 22, 2007 (Year: 2007).*
International Search Report (PCT/ISA/210) issued in PCT Application No. PCT/JP2019/001965 dated Mar. 26, 2019 with English translation (four (4) pages).
Japanese-language Written Opinion (PCT/ISA/237) issued in PCT Application No. PCT/JP2019/001965 dated Mar. 26, 2019 (five (5) pages).
Extended European Search Report issued in European Application No. 19768195.0 dated Oct. 18, 2021 (13 pages).

* cited by examiner

[FIG. 1]
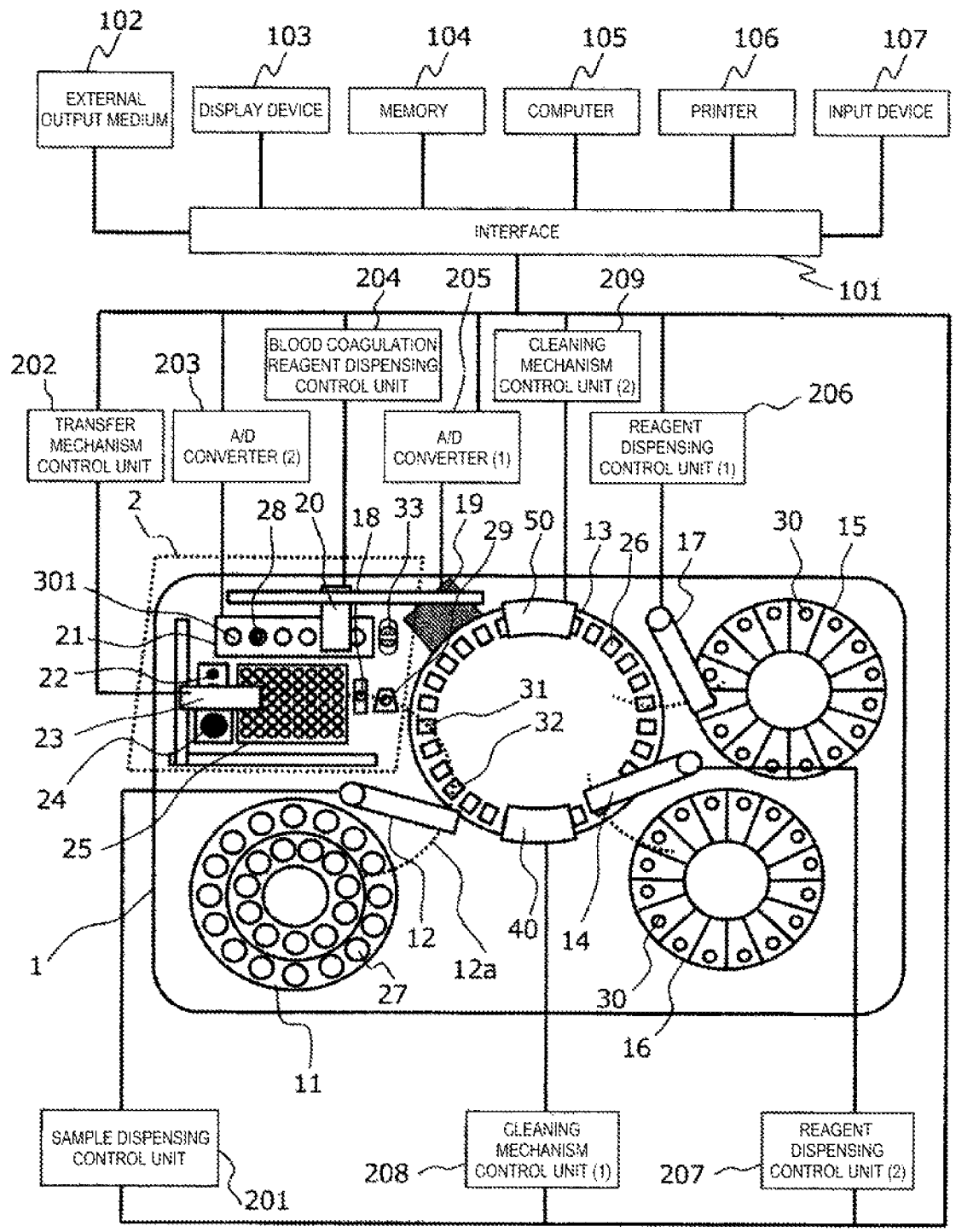

[FIG. 2]
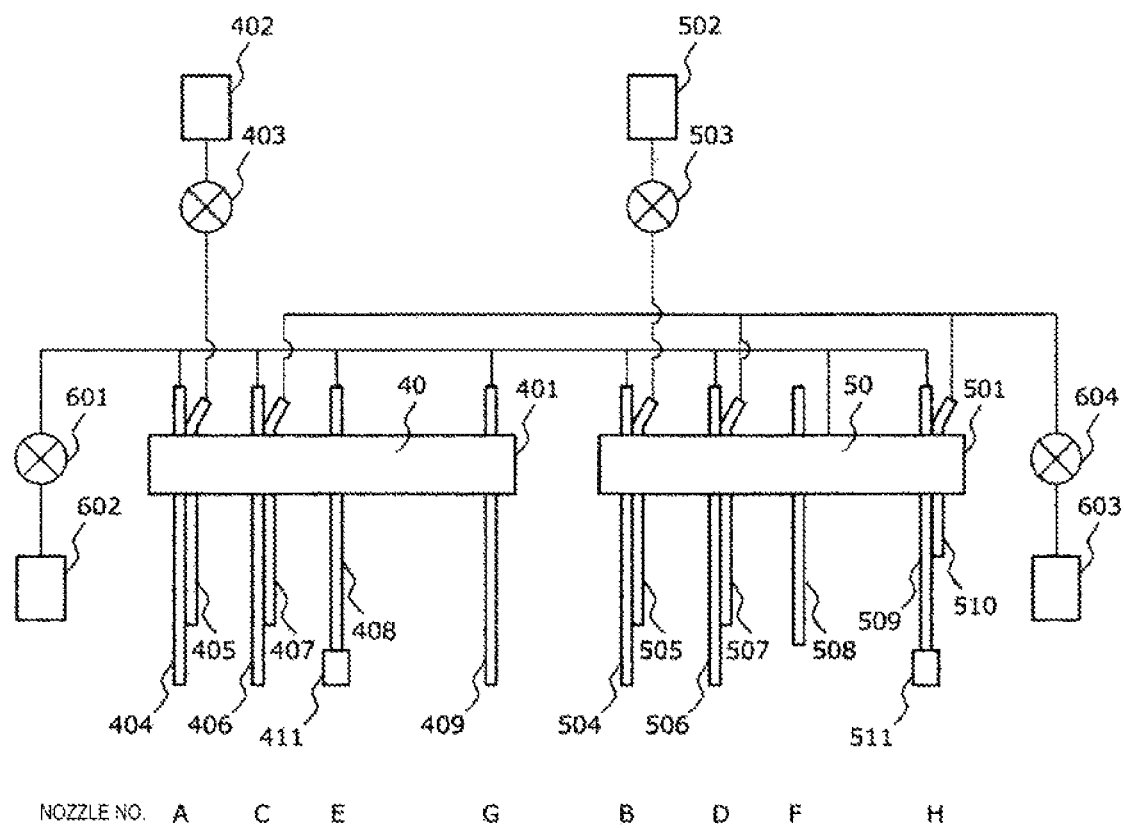

[FIG. 3]
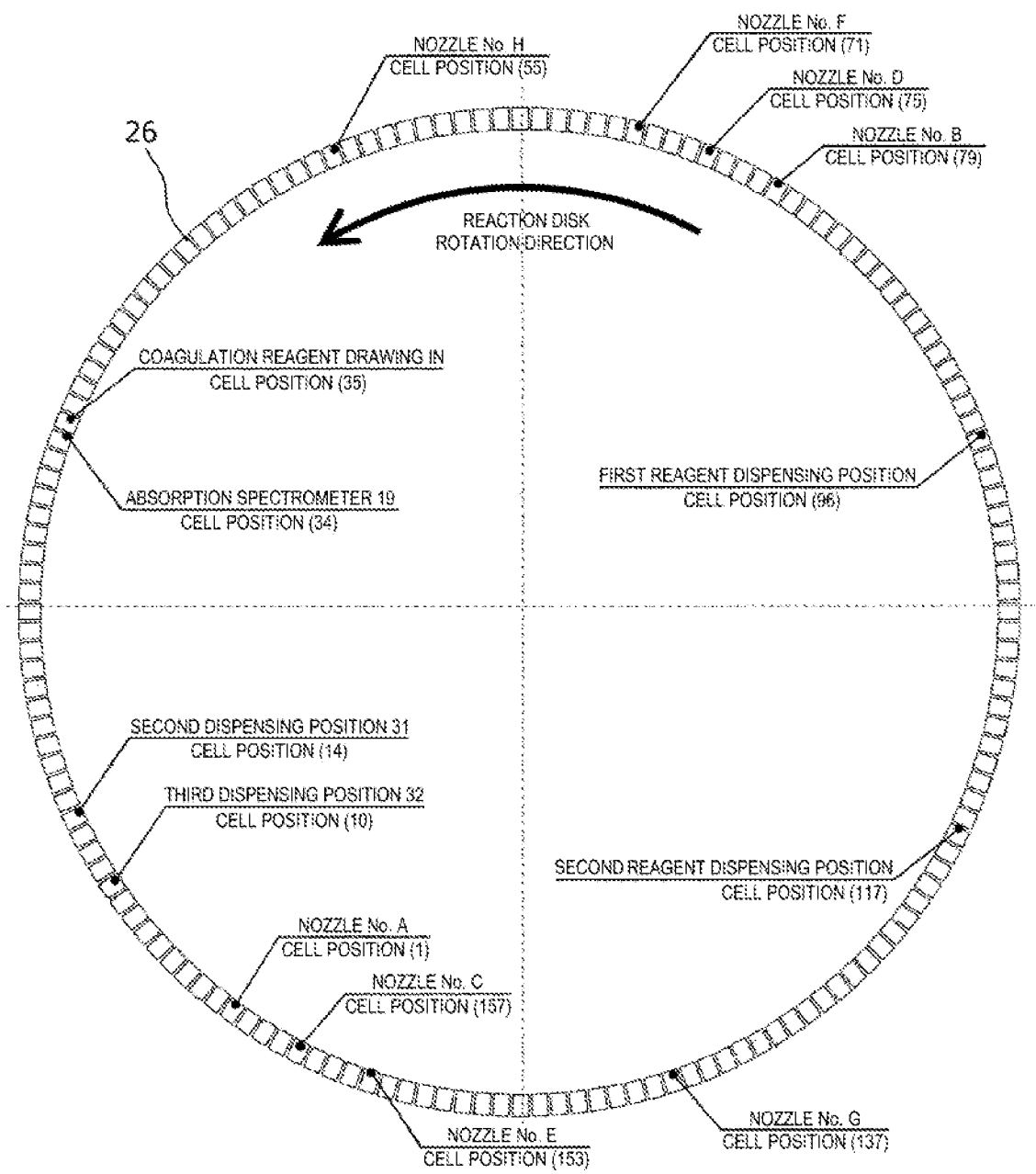

FIG. 5A — START CLEANING NOZZLE CLEANING OPERATION

FIG. 5B — CLEAN USED CELL

FIG. 5C — ACCUMULATE ALKALINE CLEANING LIQUID

FIG. 5D — IMMERSE CLEANING NOZZLE IN ALKALINE CLEANING LIQUID

FIG. 5E — ACCUMULATE CLEANING WATER

FIG. 5F — IMMERSE CLEANING NOZZLE IN CLEANING WATER

FIG. 5G — END

AUTOMATIC ANALYSIS DEVICE

TECHNICAL FIELD

The present invention relates to an automatic analysis device that automatically analyzes a component contained in a biological sample such as blood.

BACKGROUND ART

As an analysis device that analyzes a component amount contained in a sample, there is known an automatic analysis device that measures an amount of transmitted light or scattered light of a single wavelength or a plurality of wavelengths obtained by radiating a reaction liquid in which a sample and a reagent are mixed with light from a light source to calculate the component amount based on a relationship between the amount of light and a concentration.

In the fields of biochemical examination and hematological examination, the automatic analysis device includes a biochemical analysis device that performs quantitative and qualitative analyses of a target component in a biological sample, a blood coagulation analysis device that measures coagulation ability of blood which is a sample, and the like.

PTL 1 discloses an automatic analysis device for detecting a presence or absence of a liquid in a reaction vessel at a time of activation of the device, the automatic analysis device is provided with a plurality of movable reaction vessels in which a sample reacts with a reagent, a sample dispenser for dispensing the sample into the reaction vessel, a spectrometer for analyzing a reaction liquid in the reaction vessel, a reaction vessel cleaning unit for cleaning the reaction vessel, and a liquid detector for detecting the presence or absence of a liquid in the reaction vessel.

PTL 2 discloses an automatic analysis device which is configured such that a row of reaction vessels disposed in a loop shape are rotated by an amount of a plurality of reaction vessels each time, during the time, for the plurality of reaction vessels, when a reaction vessel is moved to a cleaning position, a specimen dispensing position, and a reagent addition position, cleaning, specimen dispensing, and reagent addition can be performed respectively, and specimen measurement can be performed at a measurement position. Prior to the specimen dispensing, it is determined whether the reaction vessel located at a vessel position from the cleaning position to the specimen dispensing position has already been cleaned, and when the reaction vessel has been cleaned, the specimen dispensing starts from the reaction vessel that has been cleaned.

CITATION LIST

Patent Literature

PTL 1: JP-A-H11-352131
PTL 2: JP-A-H8-313537

SUMMARY OF INVENTION

Technical Problem

The reaction vessel on which the analysis is completed are sequentially cleaned and repeatedly used for analysis. In a cleaning mechanism in the automatic analysis device, the reaction liquid in which the sample and the reagent are reacted is drawn in by a plurality of intake nozzles and discharge nozzles provided in the cleaning mechanism, and the reaction cell is cleaned by repeatedly performing discharging and drawing in of the cleaning liquid. The intake nozzle of the cleaning mechanism corresponding to a first cleaning step directly draws in the reaction liquid, and the intake nozzle draws in more clean cleaning liquid as the cleaning step becomes later. In a final cleaning step, the intake nozzle performs drawing and drying as a final finish. During a normal operation, the intake nozzle in the later cleaning step does not draw in the reaction liquid.

However, regarding a case where a power supply is stopped due to power failure or the like during an analysis operation, since it is unknown which reaction vessel contains the reaction liquid after the power supply is turned on again, a cleaning nozzle that performs drawing in and drying as a final finish in a final cleaning step may draw in the reaction liquid, the cleaning nozzle in the final step to be originally clean may be contaminated in the reaction liquid, and carryover may occur.

Therefore, it is necessary, in PTL 1, to provide a liquid detector for detecting the presence or absence of a liquid in the reaction vessel to determine a position of the reaction cell before the start of first cleaning after start-up of the analysis device, and it is necessary, in PTL 2, to store a correspondence relationship between the vessel position and the reaction vessel held at the vessel position when an entire operation of the reaction disk is completed.

An object of the invention to provide an automatic analysis device that avoids carryover and prevents deterioration of analysis performance without controlling a reaction cell position.

Solution to Problem

The invention provides an automatic analysis device including: a reaction cell in which a sample and a reagent are mixed and allowed to react; a light source configured to radiate light onto the mixed liquid of the sample and the reagent, the mixed liquid being dispensed into the reaction cell; a detector configured to detect the light radiated from the light source; and a cleaning mechanism configured to clean the reaction cell. The cleaning mechanism includes an intake nozzle configured to draw in a liquid from the reaction cell and a discharge nozzle configured to discharge a liquid into the reaction cell; the intake nozzle and the discharge nozzle are movable vertically; and the intake nozzle is cleaned by lowering the intake nozzle into the reaction cell, in which a cleaning liquid or cleaning water is accumulated, without drawing in the cleaning liquid or cleaning water.

Advantageous Effect

The automatic analysis device of the invention avoids carryover and prevents deterioration of analysis performance by cleaning the cleaning nozzle by the cleaning liquid before performing an analysis.

BRIEF DESCRIPTION OF DRAWINGS

FIG. 1 is a diagram showing a basic configuration of an automatic analysis device according to a first embodiment.

FIG. 2 is a diagram showing a configuration of a first cleaning mechanism and a second cleaning mechanism according to the first embodiment.

FIG. 3 is a diagram showing reaction cell positions of a cleaning nozzle according to the first embodiment.

FIGS. 5A to 5G are a flowchart illustrating an operation of cleaning the contaminated cleaning nozzle according to the first embodiment.

FIGS. 8A to 8L are a flowchart illustrating a sequence of an analysis operation according to the first embodiment.

FIGS. 9A to 9M are a flowchart illustrating a sequence of an analysis operation according to a second embodiment.

DESCRIPTION OF EMBODIMENTS

Figure 4A:
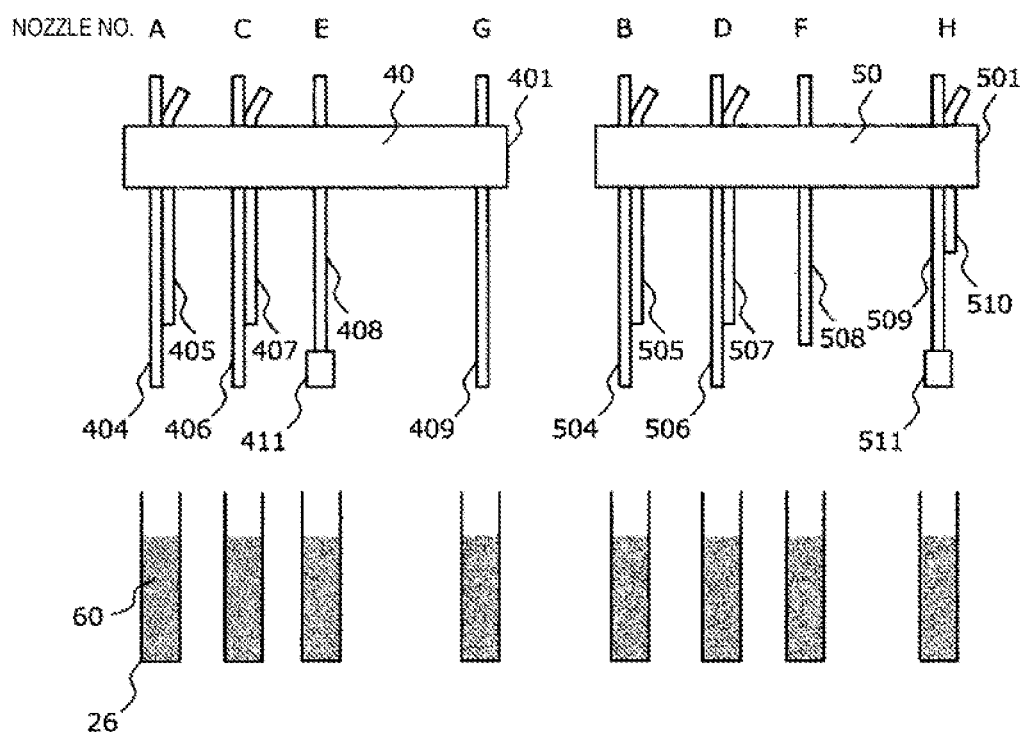
FIGS. 4A and 4B are diagrams showing contamination ranges of cleaning nozzles according to the first embodiment.

Hereinafter, embodiments of the invention will be described in detail with reference to drawings. In all the drawings for describing the present embodiment, components having the same function are denoted by the same reference numeral in principle, and a repetitive description thereof will be omitted as much as possible.

First Embodiment

<Basic Configuration of Device>

FIG. 1 is a diagram showing a basic configuration of an automatic analysis device according to the present embodiment. Here, as an aspect of the automatic analysis device, an example of a complex automatic analysis device including a turntable biochemical analysis unit and a blood coagulation time analysis unit will be described.

As shown in FIG. 1, in a housing of an automatic analysis device 1, a reaction disk 13, a sample disk 11, a first reagent disk 15, a second reagent disk 16, a blood coagulation time analysis unit 2, and an absorption spectrometer 19 are disposed.

The reaction disk 13 is a disk-shaped unit which is rotatable in a clockwise direction and a counterclockwise direction, and a plurality of reaction cells 26 can be disposed on a circumference of the reaction disk 13. Here, the reaction cell 26 is used as a vessel for drawing in, by a blood coagulation reagent dispensing probe 20, a reagent, a sample, or a cleaning liquid for a blood coagulation analysis as well as an optical measurement of a biochemical analysis.

The sample disk 11 is a disk-shaped unit which is rotatable in the clockwise direction and the counterclockwise direction, and a plurality of sample vessels 27 accommodating samples such as a standard sample and a test sample and the like can be disposed on a circumference of the sample disk 11.

The first reagent disk 15 and the second reagent disk 16 are disk-shaped units which are rotatable in the clockwise direction and the counterclockwise direction, and a plurality of reagent vessels 30 accommodating a reagent containing a component that reacts with a component of each examination item contained in the sample can be disposed on circumferences of the first reagent disk 15 and the second reagent disk 16. Although not shown in the figure, the first reagent disk 15 and the second reagent disk 16 can be provided with a cooling mechanism or the like, so that the reagent in the disposed reagent vessels 30 can be kept cold. In a case of a two-reagent system, a configuration in which both reagent i and reagent ii are disposed on the first reagent disk 15, a configuration in which both reagent i and reagent ii are disposed on the second reagent disk 16, and a configuration in which the reagent i or the reagent ii is disposed in each of the first reagent disk 15 and the second reagent disk 16, and the like are considered, and whether the reagent is disposed on the first reagent disk 15 or the second reagent disk 16 may be freely set by an operator.

A sample dispensing probe 12 is disposed between the sample disk 11 and the reaction disk 13. The sample dispensing probe 12 is disposed to be able to draw in and dispense the sample and the reagent to a sample vessel 27 on the sample disk 11, the reaction cell 26 on the reaction disk 13, a reaction vessel 28 at a first dispensing position 18 of the blood coagulation time analysis unit 2, and a reagent vessel (for a blood coagulation analysis) 29 by a rotational operation. The reaction vessel 28 is used for an optical measurement of the blood coagulation analysis. A cooling mechanism or the like can be provided in a location where the reagent vessel (for a blood coagulation analysis) 29 is provided, so that the reagent in the disposed reagent vessel (for a blood coagulation analysis) 29 can be kept cold. A sample dispensing probe cleaning tank (not shown) can be disposed on a track 12a of the sample dispensing probe 12, and the probe can be cleaned therein. Although a broken line is shown as the track 12a of the sample dispensing probe 12 in FIG. 1, the broken line is a part of the track 12a of the sample dispensing probe 12, and not only the broken line but also a rotational track can be drawn.

Similarly, a first reagent dispensing probe 17 is disposed between the first reagent disk 15 and the reaction disk 13, and a second reagent dispensing probe 14 is disposed between the second reagent disk 16 and the reaction disk 13. The first reagent dispensing probe 17 and the second reagent dispensing probe 14 are disposed to be able to perform a dispensing operation such as drawing in and discharging at a reaction cell 26 on the reaction disk 13 and the reagent vessel 30 on the first reagent disk 15 and the second reagent disk 16 by a rotational operation respectively.

A first cleaning mechanism 40 and a second cleaning mechanism 50 for cleaning the disposed reaction cells 26 are disposed on the reaction disk 13, and each cleaning mechanism has a plurality of cleaning nozzles. Each cleaning nozzle has at least one of an intake nozzle and a discharge nozzle, and each cleaning mechanism can move vertically. Each cleaning mechanism draws in and discards a reaction liquid in the reaction cell 26, and discharges the cleaning liquid or water to clean the reaction cell 26.

The blood coagulation time analysis unit 2 mainly includes a blood coagulation time detection unit 21, the blood coagulation reagent dispensing probe 20, a reaction vessel supply unit 25, the first dispensing position 18, a reaction vessel transfer mechanism 23, a reaction vessel discarding port 24, an optical jig magazine 22, and a blood coagulation reagent dispensing mechanism cleaning tank 33. The blood coagulation time detection unit 21 includes a plurality of reaction ports 301 each including a hole capable of holding the reaction vessel 28, a light source for radiating the held reaction vessel 28 with light, and a detector for detecting the radiated light. A disposable reaction vessel is used as the reaction vessel 28, and contamination between specimens is prevented. When a blood coagulation time measurement is included as an analysis item for the specimen, it is desirable that the reaction vessel 28 is a disposable reaction vessel because a blood clot is solidified due to fibrin in the reaction vessel.

Next, a control system and a signal processing system according to the automatic analysis device 1 will be briefly described. A computer 105 is connected to a sample dispensing control unit 201, a reagent dispensing control unit (1) 206, a reagent dispensing control unit (2) 207, a blood coagulation reagent dispensing control unit 204, an A/D converter (1) 205, an A/D converter (2) 203, a transfer mechanism control unit 202, a cleaning mechanism control unit (1) 208, and a cleaning mechanism control unit (2) 209 via an interface 101, and transmits a signal that is a command to each control unit.

The sample dispensing control unit 201 controls a dispensing operation of the sample by the sample dispensing probe 12 based on a command received from the computer 105.

The reagent dispensing control unit (1) 206 and the reagent dispensing control unit (2) 207 controls a dispensing operation of the reagent by the first reagent dispensing probe 17 and the second reagent dispensing probe 14 based on commands received from the computer 105.

The transfer mechanism control unit 202 controls an operation of transferring the reaction vessel 28 among the reaction vessel supply unit 25, the first dispensing position 18, the reaction port 301 of the blood coagulation time detection unit 21, and the reaction vessel discarding port 24 by the reaction vessel transfer mechanism 23 based on a command received from the computer 105.

The blood coagulation reagent dispensing control unit 204 dispenses a reagent for blood coagulation by the blood coagulation reagent dispensing probe 20 to the reaction vessel 28, which is transferred to the reaction port 301 and accommodates the sample dispensed by the sample dispensing probe 12, based on a command received from the computer 105. In the case of the two-reagent system, a pretreatment liquid, which is a mixed liquid of the sample and the reagent i for blood coagulation analysis mixed in the reaction cell 26, is dispensed to an empty reaction vessel 28 by the blood coagulation reagent dispensing probe 20. In this case, then, the reagent ii for blood coagulation analysis is dispensed to the reaction vessel 28 accommodating the pretreatment liquid.

The cleaning mechanism control unit (1) 208 and the cleaning mechanism control unit (2) 209 control a cleaning operation performed by the first cleaning mechanism 40 and the second cleaning mechanism 50 based on commands received from the computer 105.

In the present embodiment, although a plurality of control units respectively control a plurality of mechanisms based on commands from the computer 105, the computer 105 may be configured to directly control a plurality of mechanisms.

A photometric value of transmitted light or scattered light of the reaction liquid in the reaction cell 26 converted into a digital signal by the A/D converter (1) 205 and a photometric value of transmitted light or scattered light of reaction liquid in the reaction vessel 28 converted into a digital signal by the A/D converter (2) 203 are put into the computer 105.

The interface 101 is connected to a printer 106 for printing when a measurement result is output as a report or the like, a memory 104 or an external output medium 102 serving as a storage device, an input device 107 such as a keyboard for inputting an operation command and the like, and a display device 103 for displaying a screen. The display device 103 includes, for example, a liquid crystal display, or a CRT display, or the like.

An analysis of a biochemical item by the automatic analysis device 1 is performed in the following procedure. First, the operator requests an examination item for each sample by using the input device 107 such as the keyboard.

In order to analyze the sample for the requested examination item, the sample dispensing probe 12 dispenses a predetermined amount of sample from the sample vessel 27 to the reaction cell 26 positioned at a second dispensing position according to an analysis parameter.

The reaction cell 26 to which the sample is dispensed is transferred by a rotation of the reaction disk 13 and stopped at a reagent dispensing position. The first reagent dispensing probe and the second reagent dispensing probe 14 dispense a predetermined amount of reagent liquid into the reaction cell 26 according to an analysis parameter of the corresponding examination item. As for a dispensing order of the sample and the reagent, the reagent may be earlier than the sample.

Thereafter, the sample and the reagent are stirred by a stirring mechanism (not shown) and mixed. When the reaction cell 26 crosses a photometric position, photometry is performed on the transmitted light and the scattered light of the reaction liquid by a photometer. The photometered transmitted light or scattered light is converted into numerical data proportional to a light amount by the A/D converter (1) 205, and the numerical data is put into the computer 105 via the interface 101.

By using the converted numerical value, a concentration data is calculated based on a calibration curve measured in advance by an analysis method specified for each examination item. Component concentration data as an analysis result of each examination item is output to the printer 106 and the screen of the display device 103.

The reaction cell 26 in which the sample and the reagent are mixed is transferred by the rotation of reaction disk 13. At a timing of being positioned at a third dispensing position 32, the sample dispensing probe 12 can draw in the mixed liquid, and dispense the mixed liquid into another reaction cell 26 positioned at a second dispensing position 31.

Here, the second dispensing position and the third dispensing position are disposed at intersections of the track 12a of the sample dispensing probe and a rotational track of the reaction cell 26 disposed on the circumference of the reaction disk 13, respectively.

Before the measurement operation described above is performed, the operator sets various parameters required for the analysis and registers the reagent and the sample via an operation screen of the display device 103. Further, the operator confirms the analysis result after the measurement by an operation screen on the display device 103.

<Configuration of Cleaning Mechanism>

FIG. 2 is a diagram showing a configuration of the first cleaning mechanism 40 and the second cleaning mechanism 50. Each cleaning mechanism includes nozzle holding units 401 or 501 holding a plurality of cleaning nozzles for drawing in and discharging the cleaning liquid from each reaction cell 26, an alkaline cleaning liquid tank 402 for storing an alkaline cleaning liquid for cleaning, a water supply pump 403 that supplies the alkaline cleaning liquid from the alkaline cleaning liquid tank to each nozzle, an acidic cleaning liquid tank 502 for storing an acidic cleaning liquid for cleaning, a water supply pump 503 that supplies the acidic cleaning liquid from the acidic cleaning liquid tank to each nozzle, an intake pump 601 for drawing in the reaction liquid, the cleaning liquid, and the cleaning water from each reaction cell by each nozzle, a waste tank 602 for discarding the reaction liquid and the cleaning liquid drawn in by the intake pump, a cleaning water tank 603 for storing the cleaning water for washing away the cleaning liquid, and a water pump 604 that supplies the cleaning water from the cleaning water tank to each nozzle.

The cleaning nozzles of the first cleaning mechanism 40 includes a reaction liquid intake nozzle 404 for drawing in the reaction liquid, a cleaning liquid discharge nozzle 405 for discharging the alkaline cleaning liquid, a cleaning liquid intake nozzle 406 for drawing in the acidic cleaning liquid, a cleaning water discharge nozzle 407 for discharging the cleaning water that washes away the cleaning liquid, a cleaning water and air bubble intake nozzle 408 for drawing in the cleaning liquid and air bubble by a nozzle tip 411, and a cell blank liquid intake nozzle 409 for drawing in a cell blank liquid.

The cleaning nozzles of the second cleaning mechanism 50 includes a cleaning liquid intake nozzle 504 for drawing in the alkaline cleaning liquid, a cleaning liquid discharge nozzle 505 for discharging the acidic cleaning liquid, a cleaning water intake nozzle 506 for drawing in the cleaning water, a cleaning water discharge nozzle 507 for discharging the cleaning water that washes away the cleaning liquid, a cell blank liquid discharge nozzle 508 for discharging a cell blank liquid, a finishing intake nozzle 509 including a nozzle tip 511 for drawing in the cleaning liquid at the end of a cleaning step, and a tip cleaning water discharge nozzle 510 for the cleaning the nozzle tip 511.

FIG. 3 is a diagram showing reaction cell positions of the respective cleaning nozzles. When the reaction liquid intake nozzle 404 and the cleaning liquid discharge nozzle 405 (nozzle No. A) are at a cell position (1), the cleaning liquid intake nozzle 406 and the cleaning water discharge nozzle 407 (nozzle No. C) are disposed at a cell position (157), the cleaning water and air bubble intake nozzle 408 (nozzle No. E) is disposed at a cell position (153), the cell blank liquid intake nozzle 409 (nozzle No. G) is disposed at a cell position (137), the cleaning liquid intake nozzle 504 and the cleaning liquid discharge nozzle 505 (nozzle No. B) are disposed at a cell position (79), the cleaning water intake nozzle 506 and the cleaning water discharge nozzle 507 (nozzle No. D) are disposed at a cell position (75), the cell blank liquid discharge nozzle 508 (nozzle No. F) is disposed at a cell position (71), and the finishing intake nozzle 509 and the tip cleaning water discharge nozzle 510 (nozzle No. H) are disposed at a cell position (55). At this time, the absorption spectrometer 19 is disposed at a cell position (34), the second dispensing position 31 is disposed at a cell position (14), the third dispensing position 32 is disposed at a cell position (10), a first reagent dispensing position is disposed at a cell position (96), and a second reagent dispensing position is disposed at a cell position (117).

For the nozzles No. A, B, C and D, although the intake nozzle and the discharge nozzle are lowered to the same cell, but the intake nozzle and the discharge nozzle can also be separated according to an order of a cleaning sequence. The number of cleaning times with the cleaning liquid and the cleaning water can be increased or decreased as appropriate.

In the present embodiment, 160 reaction cells 26 are disposed in total, and the numbers of the reaction cells 26 are numbered in a clockwise order, and the reaction disk 13 rotates in a counterclockwise manner. However, the number of reaction cells, a numbering order of the reaction cells, and a rotation direction of the reaction disk may be appropriately selected.

<Operation of Cleaning Mechanism>

Each cleaning nozzle is lowered into the reaction cell 26, and if the reaction liquid, the cleaning liquid, or the cleaning water exists in the reaction cell, the reaction liquid, the cleaning liquid, or the cleaning water is drawn in. Subsequently, each cleaning nozzle discharges the cleaning liquid and the cleaning water and rises again up to above the reaction cell 26. During a stop of the reaction cell while the cleaning nozzle moves vertically, the sample is discharged at the second dispensing position 31. The reaction cell 26 moves while the cleaning nozzle rises up to above the reaction cell. At the time, the reaction cell moves by an amount of ¼ of a total number of reaction cells+1 in one cycle (from the dispensing to a next dispensing). If the total number of reaction cells is 160, the reaction cell is moved by an amount of 41 reaction cells. Accordingly, the reaction cell goes through the cleaning step in order every two cycles.

In a first cleaning step, for each reaction cell 26 in which the analysis is completed, first, the reaction liquid intake nozzle 404 draws in the reaction liquid, and the cleaning liquid discharge nozzle 405 discharges an initial alkaline cleaning liquid. In a next cleaning step, the cleaning liquid intake nozzle 504 draws in the alkaline cleaning liquid discharged in the previous cleaning step, and the cleaning liquid discharge nozzle 505 discharges acidic cleaning liquid. In a next cleaning step, similarly, the cleaning liquid intake nozzle 406 draws in the acidic cleaning liquid, the cleaning water discharge nozzle 407 discharges cleaning water to rinse the cleaning liquid. Subsequently, again, the cleaning water intake nozzle 506 draws in the cleaning water, and the cleaning water discharge nozzle 507 discharges cleaning water. As described above, the drawing in and the discharging of the cleaning liquid is repeated a plurality of times, and the cleaning liquid is rinsed by the cleaning water a plurality of times so as to gradually clean the reaction cell 26. At this time, an order of the alkaline cleaning liquid and the acidic cleaning liquid may be reversed, and the cleaning liquid to be used can be appropriately selected.

In a next cleaning step, the cleaning water and the air bubbles attached on a wall surface of the reaction cell are removed and drawn in by the cleaning water and air bubble intake nozzle 408 including the nozzle tip 411 for removing air bubbles attached on the wall surface of the reaction cell. In a next cleaning step, the cell blank liquid discharge nozzle 508 discharges cell blank liquid to the reaction cell in which the cleaning water is drawn in by the cleaning water and air bubble intake nozzle 408. After the discharged cell blank liquid is photometered by the absorption spectrometer, the cell blank liquid intake nozzle 409 draws in the cell blank liquid. In a final cleaning step, the cell blank liquid is drawn in by the finishing intake nozzle 510 including the nozzle tip 511, and the cleaning step ends. The cleaned reaction cell moves to a sample discharging position and a sample is discharged and analyzed.

The tip cleaning water discharge nozzle 510 discharges cleaning water during a preparation operation before the start of analysis operation, and cleans the nozzle tip 511. No operation is performed during an analysis operation or a maintenance operation.

<Problem of Cleaning Mechanism>

When the cleaning operation is normally performed, the cleaning step is sequentially repeated for each reaction cell. However, when a stop button is pressed during the analysis operation, or when an ongoing analysis operation is stopped due to a mechanical alarm or the like, or when a power supply is stopped due to power failure or the like, a position of the reaction cell after the operation is restarted or the power supply is turned on again is not a position immediately before the stop. The cleaning nozzle for drawing in the cleaning liquid draws in a cleaner cleaning liquid as the cleaning step becomes later. For example, the finishing intake nozzle 509 used in the final cleaning step is a nozzle for drawing in the cell blank liquid which is hardly contaminated with the reaction liquid. If the finishing intake nozzle 509 and the nozzle tip 511 are contaminated by drawing in the reaction liquid, there is a possibility that the reaction cell is contaminated during the next cleaning.

Figure 4B:
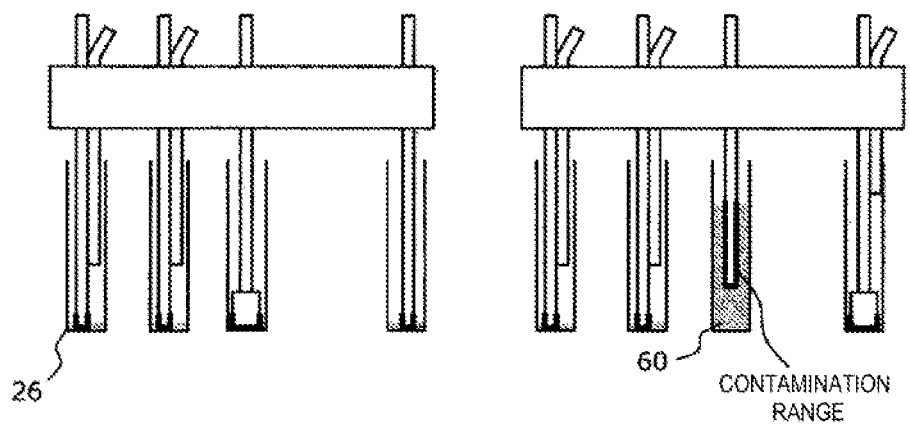

FIG. 4 is a diagram showing contamination ranges of the cleaning nozzles at this time. FIG. 4(*a*) shows contamination ranges before drawing in of the reagent, and FIG. 4(*b*) shows contamination ranges after drawing in of the reagent. Intake nozzles of the reaction liquid intake nozzle 404, the cleaning liquid intake nozzle 406, the cleaning water and air bubble intake nozzle 408, the cell blank liquid intake nozzle 409, the cleaning liquid intake nozzle 504, the cleaning water intake nozzle 506, and the finishing intake nozzle 509 are lowered while drawing in the reagent 60, and therefore, only tip portions contacting the reagent 60 are contaminated. Since the cleaning water and air bubble intake nozzle 408 and the finishing intake nozzle 509 each includes a nozzle tip, an area of the tip portion to be contaminated is wider than that of the other cleaning nozzles. Since the cell blank liquid discharge nozzle 508 does not include the intake nozzle, a wide range is contaminated. Further, when the control of the automatic analysis device is not used, for example, when the cleaning mechanism is manually lowered into the reaction cell, the contamination range of the cleaning nozzle may be in a wider range.

However, since the reaction liquid intake nozzle 404 contacts the alkaline cleaning liquid when the alkaline cleaning liquid is discharged from the cleaning liquid discharge nozzle 405, a range of the reaction liquid intake nozzle 404 contaminated by the reagent 60 may be cleaned by the alkaline cleaning liquid due to the contact with the alkaline cleaning liquid. In addition, since the alkaline cleaning liquid discharged by the cleaning liquid discharge nozzle 405 is drawn in, similarly, the range contaminated by the reagent 60 may be cleaned by the alkaline cleaning liquid due to the contact with the alkaline cleaning liquid. Further, since tip ends of the nozzles of the cleaning liquid discharge nozzle 405, the cleaning liquid discharge nozzle 505, the cleaning water discharge nozzle 407, the cleaning water discharge nozzle 507, and the tip cleaning water discharge nozzle 510 are provided at positions higher than the intake nozzles, the tip ends do not contact the reagent 60 and are not contaminated.

On the other hand, since the cleaning liquid intake nozzle 406, the cleaning water and air bubble intake nozzle 408, the cell blank liquid intake nozzle 409, the cleaning water intake nozzle 506, the finishing intake nozzle 509, and the cell blank liquid discharge nozzle 508 cannot be cleaned by the alkaline cleaning liquid, the nozzles cannot be cleaned when being contaminated once. Therefore, in the embodiment, these cleaning nozzles are cleaned.

<Features of Invention>

FIG. 5 is a flowchart illustrating an operation of cleaning the contaminated cleaning nozzle (cleaning nozzle cleaning operation). When the cleaning nozzle cleaning operation is started ((a) in FIG. 5), first, the reaction cell used during the analysis operation and the reaction cell used in the cleaning nozzle cleaning operation are cleaned ((b) in FIG. 5). After cleaning the reaction cell, an alkaline cleaning liquid is accumulated in the reaction cell by the cleaning liquid discharge nozzle 405 ((c) in FIG. 5).

Figures 6A, 6B, 6C, 6D, 6E:
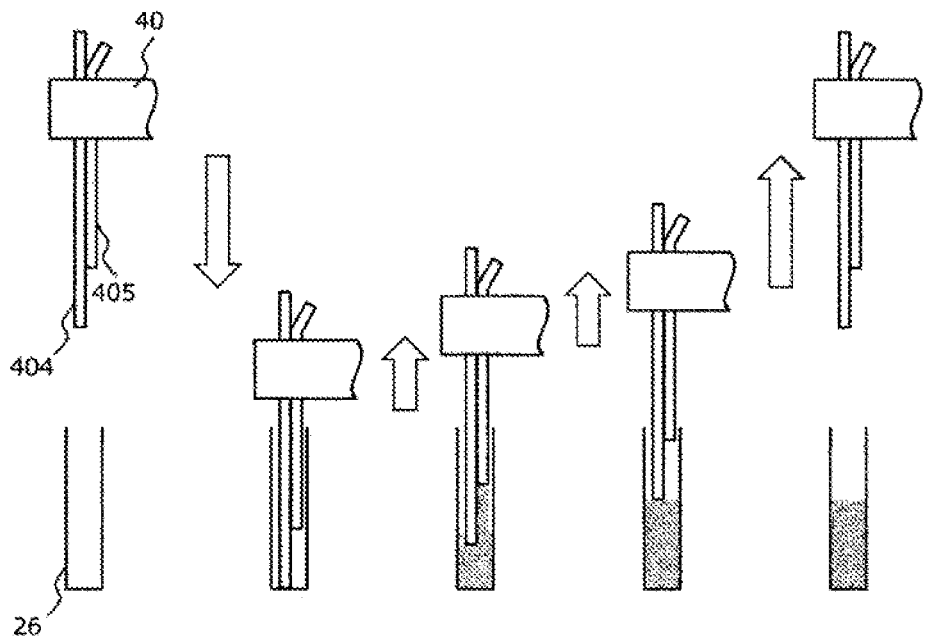
FIGS. 6A to 6E are sequences of a cleaning mechanism for accumulating an alkaline cleaning liquid according to the first embodiment.

Here, an operation of the cleaning mechanism when the alkaline cleaning liquid is accumulated will be described with reference to FIG. 6. The cleaning nozzle is lowered from a state where the cleaning nozzle is at an upper limit point (FIG. 6(*a*)) until coming into contact with a cell bottom (FIG. 6(*b*)). Subsequently, the cleaning nozzle rises while discharging the alkaline cleaning liquid (FIG. 6(*c*)). A similar effect can be obtained by discharging the alkaline cleaning liquid after the cleaning nozzle is raised. The cleaning nozzle stops at an overflow intake height where the alkaline cleaning liquid is larger than a required amount, and a liquid height of the cleaning liquid is controlled by drawing in excess alkaline cleaning liquid (FIG. 6(*d*)). Subsequently, the cleaning nozzle rises to the upper limit point (FIG. 6(*e*)). The operation can be performed a plurality of times, desirably four times in total, and thus the alkaline cleaning liquid can be accumulated. In the case of a device configuration in which only one intake pump is provided as shown in FIG. 2, it is desirable that an inside of the reaction cell used for accumulating the alkaline cleaning liquid in the step of (b) in FIG. 5 is empty. This is because, since a plurality of cleaning nozzles are controlled by a single intake pump, drawing in and discharging are performed at the same timing by the plurality of cleaning nozzles. However, when a plurality of electromagnetic valves or intake pumps are provided, a drawing in operation of the reaction liquid intake nozzle 404 can be performed independently, and the invention is not limited thereto. The reaction cells rotate sequentially, and the cleaning nozzle is lowered and immersed in the reaction cell in which the cleaning liquid is accumulated (FIG. 5(*c*)). Accordingly, the nozzle can be cleaned by the cleaning liquid.

After the alkaline cleaning liquid is accumulated, the cleaning nozzle is lowered and immersed in the reaction cell in which the alkaline cleaning liquid is accumulated ((d) in FIG. 5). At the time, since drawing in of the intake nozzle is not performed, the cleaning nozzle can be immersed in the alkaline cleaning liquid up to an upper portion of the cleaning nozzle. After immersing in the cleaning liquid, the cleaning water is accumulated in the reaction cell by the cleaning water discharge nozzle 407 and the cleaning water discharge nozzle 507 ((e) in FIG. 5).

Figures 7A, 7B, 7C, 7D, 7E:
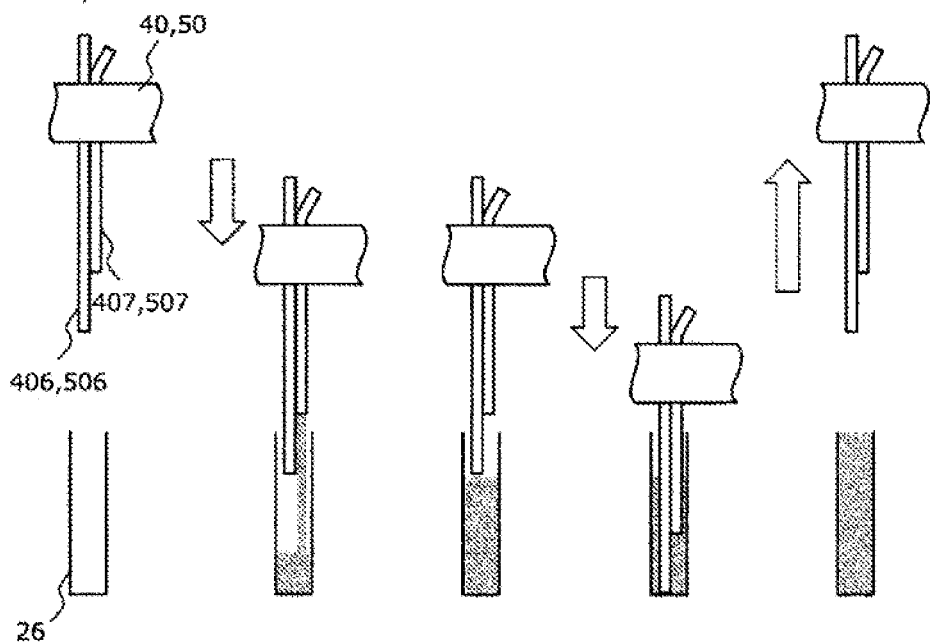
FIGS. 7A to 7E are sequences of a cleaning mechanism for accumulating cleaning water according to the first embodiment.
Figure 8A:
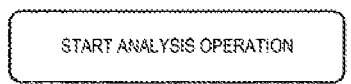
Figure 8B:
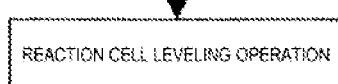
Figure 8C:
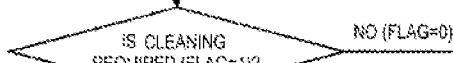
Figure 8D:
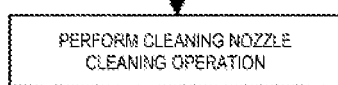
Figure 8E:
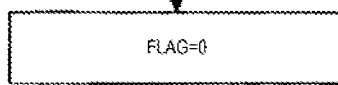
Figure 8F:
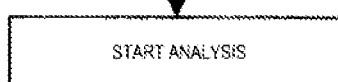
Figure 8G:
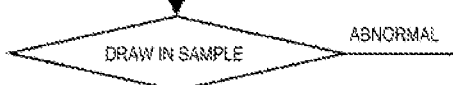
Figure 8H:
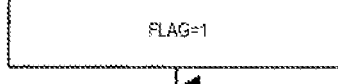
Figure 8I:
Figure 8J:
Figure 8K:
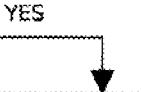
Figure 9A:
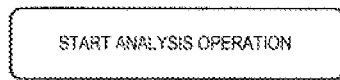
Figure 9B:
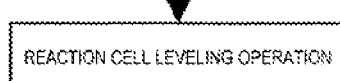
Figure 9C:
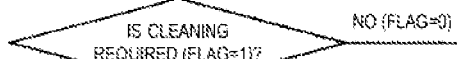
Figure 9D:
Figure 9E:
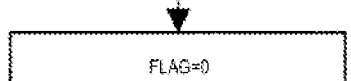
Figure 9F:
Figure 9G:
Figure 9H:
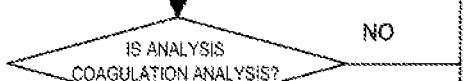
Figure 9I:
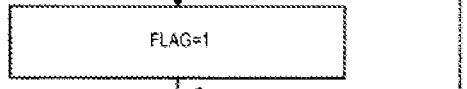
Figure 9J:
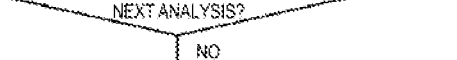
Figure 9K:
Figure 9L:
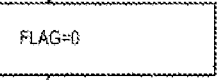

Here, an operation of the cleaning mechanism when the cleaning water is accumulated will be described with reference to FIG. 7. The cleaning nozzle is lowered from a state where the cleaning nozzle is at the upper limit point (FIG. 7(*a*)) to an overflow intake height, then stopped, and discharges cleaning water (FIG. 7(*b*)). Subsequently, overflow intake is performed on excess cleaning water to control a liquid height of the cleaning water (FIG. 7(*c*)). An overflow intake height at this time is kept at a position higher than the overflow intake height of (d) in FIG. 5 in order to rinse the cleaning liquid. Subsequently, the cleaning nozzle is lowered until the cleaning nozzle comes into contact with a cell bottom (FIG. 7(*d*)). After the lowering, the cleaning nozzle rises to the upper limit point (FIG. 7(*e*)). As a result, the nozzles No. C and D can be rinsed with cleaning water accumulated therein.

The reaction cells rotate sequentially, and the cleaning nozzle is lowered and immersed in the reaction cell in which the cleaning water is accumulated ((f) in FIG. 5). As a result, the nozzles No. E, F, G and H can be rinsed with cleaning water. A cleaning effect can be enhanced by rinsing all of the nozzles with the cleaning water a plurality of times.

It is desirable that a discharge amount of the cleaning liquid is larger than the maximum amount of the reaction liquid, less than the discharge amount of the cleaning water, and the discharge amount of the cleaning water is larger than the discharge amount of the cleaning liquid. For example, when the maximum amount of the reaction liquid is 200 µl, the discharge amount of the cleaning liquid is set to 250 µl, and the discharge amount of the cleaning water is set to 300 µl.

FIG. 8 is a flowchart illustrating a sequence of the analysis operation. When the analysis operation is started ((a) in FIG. 8), first, a reaction cell leveling operation is performed in order to level use frequencies of the reaction cells ((b) in FIG. 8). Accordingly, the cell position at the start of using the reaction cell is appropriately changed. The reaction cell leveling operation can be skipped. Subsequently, it is determined whether cleaning of the cleaning nozzle is required ((c) in FIG. 8). Here, when a flag at the end of a previous analysis is 1, cleaning is required, and when the flag is 0, cleaning is not required. When cleaning is required, a cleaning nozzle cleaning operation is performed ((d) in FIG. 8). After the cleaning nozzle cleaning operation is performed, the flag is changed to 0 ((e) in FIG. 8). Then, the analysis is started ((f) in FIG. 8). A sample dispensing mechanism draws in the sample ((g) in FIG. 8). When the sample can be normally drawn in, the flag is changed to 1. When a sample shortage or a clogging occurs, the flag is not changed and remains 0 ((i) in FIG. 8). When there is a next analysis, the sample dispensing mechanism draws in the sample subsequently. When there is no next analysis (FIG. 8 (j)), it is determined whether the cleaning of all used cells is completed ((k) in FIG. 8), and when the cleaning is completed, the flag is changed to 0 ((l) in FIG. 8). When the analysis ends while the cleaning of the cells is not completed for some reason, the flag remains 1 ((m) in FIG. 8). When the analysis ends while the flag remains 1, the cleaning nozzle cleaning operation is performed in a next analysis start instruction. That is, when there is a possibility that the reaction liquid remains in the reaction cell, it is determined that the cleaning nozzle is contaminated, and the cleaning nozzle cleaning operation is to be performed.

Here, it is desirable that a flag for determining whether or not to clean the cleaning nozzle is written into a nonvolatile memory, for example, FRAM (registered trademark). Accordingly, even in a case where a power supply of a device is stopped due to a power failure or the like during the analysis operation, since the flag indicating whether cleaning is required is stored, the cleaning nozzle cleaning operation is performed when cleaning is required even when the device is powered on again.

According to the invention, the cleaning nozzle can be cleaned by the cleaning liquid before the analysis is performed even when the cleaning nozzle is contaminated, therefore, carryover of the reagent can be avoided, and deterioration of the analysis performance can be prevented. The cleaning nozzle cleaning operation before the analysis operation is performed only when the reagent required to be cleaned by the cleaning liquid is used, so that it is possible to minimize an extension of time required before the analysis operation. Even when the control of the automatic analysis device is not performed, for example, when the cleaning mechanism is manually lowered into the reaction cell, the carryover of the reagent can be avoided since cleaning is performed when the reagent remains. Further, when maintenance, such as a cell blank measurement, is performed in which the cleaning nozzle is required to be lowered into the reaction cell, special cleaning operation or control of the reaction cell position is not required, which can contribute to a reduction in maintenance time. In addition, since there is no need to add a new cleaning nozzle or a liquid level detector, it is possible to prevent an increase in size and cost of the device.

Second Embodiment

In the first embodiment, a case has been described in which all of the specimen and the reagent that can be used in the analysis are to be cleaned. Here, in a second embodiment, a case in which only a specific item is to be cleaned will be described with reference to FIG. 9.

For example, a reagent containing a component of a protein such as a thrombin reagent used for quantitatively determining fibrinogen in plasma, which is one of blood coagulation analysis items, is required to be cleaned by an alkaline cleaning liquid, and the cleaning cannot be performed with only water. When the operation is restarted after the device is stopped in a state in which the reagent that is required to be cleaned by the cleaning liquid is stored in the reaction cell, the cleaning nozzle may be contaminated with the reagent that is required to be cleaned by the cleaning liquid. The specific item may or may not be selected by a user as appropriate.

(a) to (g) in FIG. 9 are similar to those in the first embodiment. After the sample dispensing mechanism draws in the sample ((g) in FIG. 9), it is determined whether the analysis item of the sample uses a reagent that is required to be cleaned by the cleaning liquid ((h) in FIG. 9). When the reagent is a reagent that is required to be cleaned with the cleaning liquid, the flag is changed to 1, and when the reagent is not a reagent that is required to be cleaned with the cleaning liquid, the flag is not changed ((i) in FIG. 9). The following (i) to (m) in FIG. 9 are similar to those in the first embodiment. Accordingly, since it is possible to minimize the performing of the cleaning nozzle cleaning operation as required, it is possible to minimize a time before the analysis operation.

In addition, when sample dispensing of the blood coagulation analysis is performed every two cycles, a cell position of the reaction cell to be used is fixed to only an even cell or odd cell. At this time, since the cell which is a target of the cleaning nozzle cleaning operation is only the even cell or odd cell, a time required for performing the cleaning nozzle cleaning operation is halved, and the time before the analysis operation can be further reduced.

Third Embodiment

In the first and second embodiments, a case has been described in which only the cleaning nozzle is taken as a cleaning target. In a third embodiment, a case will be described in which the sample dispensing probe, the first reagent dispensing probe, the second reagent dispensing probe, and the blood coagulation reagent dispensing probe are also taken as the cleaning targets in addition to the cleaning nozzle. When a stop button is pressed during the analysis operation, or when the ongoing analysis operation is stopped due to a mechanism alarm or the like, or when the power supply is stopped due to power failure or the like, the sample or the reagent may also be remained on these probes. When the operation is restarted without performing maintenance such as probe cleaning, carryover of the reagent and the specimen may occur. Therefore, by cleaning each probe with the cleaning liquid during the cleaning nozzle cleaning operation, carryover can be prevented.

The cleaning of the sample dispensing probe is performed by drawing in and discharging the cleaning liquid, and discharging inner cleaning water during the cleaning nozzle cleaning operation.

The cleaning of the first reagent dispensing probe and the second reagent dispensing probe is performed by drawing in and discharging the cleaning liquid, and discharging inner cleaning water during the cleaning nozzle cleaning operation.

Further, in the cleaning of the blood coagulation reagent dispensing probe, the first reagent dispensing probe that has been cleaned discharges cleaning liquid to the reaction cell that is cleaned in the cleaning nozzle cleaning operation. When the reaction cell to which the cleaning liquid is discharged moves to a coagulation reagent intake position, the cleaning liquid is drawn in by the blood coagulation reagent dispensing probe. Thereafter, cleaning is performed by discharging the cleaning liquid and discharging inner cleaning water.

Accordingly, each probe can be cleaned without providing a new cleaning time, and deterioration of the analysis performance due to carryover can be prevented.

Fourth Embodiment

In the first and second embodiments, although the configuration has been described in which the cleaning liquid and the cleaning water are accumulated in the reaction cell using the cleaning nozzle of the cleaning mechanism, at least one of the sample dispensing probe, the first reagent dispensing probe, the second reagent dispensing probe, or the blood coagulation reagent dispensing probe can be used to accumulate the cleaning liquid and the cleaning water in the reaction cell by providing cleaning liquid and the cleaning water vessels on the first reagent disk 15, the second reagent disk 16, or the track 12a of sample dispensing probe. Accordingly, it is possible to simplify the operation of the cleaning mechanism.

The invention is not limited to the embodiments described above, and includes various modifications. For example, the embodiments described above have been described in detail for easy understanding of the invention, and are not necessarily limited to those having all the configurations described. Apart of the configurations of a certain embodiment can be replaced with the configurations of another embodiment, and the configurations of a certain embodiment can be added to the configurations of another embodiment. Apart of the configurations of each embodiment may be added to, deleted from, or replaced with other configurations.

REFERENCE SIGN LIST

1 Automatic analysis device
2 Blood coagulation time analysis unit
11 Sample disk
12 Sample dispensing probe
12a Track of sample dispensing probe
13 Reaction disk
14 Second reagent dispensing probe
15 First reagent disk
16 Second reagent disk
17 First reagent dispensing probe
18 First dispensing position
19 Absorption spectrometer
20 Blood coagulation reagent dispensing probe
21 Blood coagulation time detection unit
22 Optical jig magazine
23 Reaction vessel transfer mechanism
24 Reaction vessel discarding port
25 Reaction vessel supply unit
26 Reaction cell (for biochemical analysis)
27 Sample vessel
28 Reaction vessel (for blood coagulation analysis)
29 Reagent vessel (for blood coagulation analysis)
30 Reagent vessel
31 Second dispensing position
32 Third dispensing position
33 Blood coagulation reagent dispensing mechanism cleaning tank
40 First cleaning mechanism
50 Second cleaning mechanism
60 Reagent
101 Interface
102 External output medium
103 Display device
104 Memory
105 Computer
106 Printer
107 Input device
201 Sample dispensing control unit
202 Transfer mechanism control unit
203 A/D converter (2)
204 Blood coagulation reagent dispensing control unit
205 A/D converter (1)
206 Reagent dispensing control unit (1)
207 Reagent dispensing control unit (2)
208 Cleaning mechanism control unit (1)
209 Cleaning mechanism control unit (2)
301 Reaction port
401 Nozzle holding unit (first cleaning mechanism)
402 Alkaline cleaning liquid tank
403 Water supply pump (alkaline cleaning liquid tank)
404 Reaction liquid intake nozzle
405 Cleaning liquid discharge nozzle (alkaline cleaning liquid)
406 Cleaning liquid intake nozzle (acidic cleaning liquid)
407 Cleaning water discharge nozzle
408 Cleaning liquid and air bubble intake nozzle
409 Cell blank liquid intake nozzle
411 Nozzle tip
501 Nozzle holding unit (second cleaning mechanism)
502 Acidic cleaning liquid tank
503 Water supply pump (acidic cleaning liquid tank)
504 Cleaning liquid intake nozzle (alkaline cleaning liquid)
505 Cleaning liquid discharge nozzle (acidic cleaning liquid)
506 Cleaning water intake nozzle
507 Cleaning water discharge nozzle
508 Cell blank liquid discharge nozzle
509 Finishing intake nozzle
510 Tip cleaning liquid discharge nozzle
511 Nozzle tip
601 Intake pump
602 Waste tank
603 Cleaning water tank
604 Water supply pump (cleaning water tank)

The invention claimed is:

1. An automatic analysis device comprising:
a rotatable reaction disk on which a plurality of reaction cells, in each of which a mixed liquid including a sample and a reagent that are mixed and have been allowed to react, are disposed on a circumference;
a light source configured to radiate light onto the mixed liquid of the sample and the reagent, the mixed liquid being dispensed into the plurality of reaction cells disposed on the reaction disk;
a detector configured to detect the light radiated from the light source;
a cleaning mechanism including a plurality of cleaning nozzles configured to clean the plurality of reaction cells; and a control unit, wherein
the control unit controls the cleaning mechanism and the reaction disk to perform:
an operation of lowering one cleaning nozzle of the plurality of cleaning nozzles in the cleaning mechanism toward a first reaction cell of the plurality of reaction cells, and the one cleaning nozzle discharging and accumulating a cleaning liquid or cleaning water into the first reaction cell,
an operation of rotating the reaction disk after the accumulation, and
an operation of, after the rotation, lowering another cleaning nozzle of the plurality of cleaning nozzles in the cleaning mechanism toward the first reaction cell without making the another cleaning nozzle draw in the cleaning liquid or cleaning water, and immersing the another cleaning nozzle in the cleaning liquid or cleaning water that is accumulated in the first reaction cell by the one cleaning nozzle,
wherein each of the plurality of cleaning nozzles includes an intake nozzle configured to draw in the cleaning liquid or cleaning water from the first reaction cell and a discharge nozzle disposed in contact with the intake nozzle and configured to discharge the cleaning liquid or cleaning water into the first reaction cell, and a lower end of the intake nozzle extends beyond a lower end of the discharge nozzle, and
the cleaning liquid is an alkaline cleaning liquid, and
wherein the control unit controls the cleaning mechanism and the reaction disk differently based on whether the alkaline cleaning liquid or the cleaning water is being discharged, such that the intake nozzle is disposed inside of the first reaction cell and in contact with a bottom surface of the first reaction cell when discharging of the alkaline cleaning liquid begins and the discharging of the alkaline cleaning liquid continues while the intake nozzle is raised away from the bottom surface until the intake nozzle reaches an overflow intake height of the first reaction cell, and the intake nozzle is disposed inside of the first reaction cell and above the bottom surface of the first reaction cell during discharging of the cleaning water and the intake nozzle is lowered into the first reaction cell and in contact with the bottom surface of the first reaction cell only after the discharging of the cleaning water has been completed.

2. The automatic analysis device according to claim 1, wherein
the control unit controls to perform cleaning of the one cleaning nozzle when an analysis of the sample is completed in a state in which cleaning of the first reaction cell is not completed.

3. The automatic analysis device according to claim 2, wherein
the control unit
controls an operation of the cleaning mechanism such that:
when the mixed liquid is accommodated in the first reaction cell at a start of the analysis of the sample, the intake nozzle draws in the mixed liquid, after the mixed liquid is drawn in, the discharge nozzle discharges and accumulates the cleaning liquid or cleaning water in the first reaction cell, and the intake nozzle is lowered while drawing in the accumulated cleaning liquid or cleaning water, thus cleaning the first reaction cell, and causes, after the cleaning of the first reaction cell, the discharge nozzle to discharge and accumulate the cleaning liquid or cleaning water again in the first reaction cell to perform cleaning of the one cleaning nozzle.

4. The automatic analysis device according to claim 1, wherein
the control unit controls an operation of the cleaning mechanism to clean the first reaction cell such that the one cleaning nozzle of the cleaning mechanism is lowered toward the first reaction cell in which the cleaning liquid or cleaning water is accumulated, and the one cleaning nozzle draws in the cleaning liquid or cleaning water while being lowered.

5. The automatic analysis device according to claim 4, wherein
the reagent that is not able to be cleaned with cleaning water is a reagent containing a component of protein.

6. The automatic analysis device according to claim 1, wherein
the control unit controls to perform the cleaning of the one cleaning nozzle when the reagent is not able to be cleaned with the cleaning water.

7. The automatic analysis device according to claim 1, wherein
the control unit controls to write information on whether the analysis of the sample is completed while the cleaning of the first reaction cell is completed into the nonvolatile memory.

8. The automatic analysis device according to claim 1, wherein
independently of each operation for performing cleaning of the cleaning nozzle,
the control unit cleans each of the plurality of reaction cells by repeating the operation of lowering or elevating the cleaning nozzle, and discharging or drawing in the cleaning liquid or cleaning water by the cleaning nozzle.

9. The automatic analysis device according to claim 1, wherein the control unit performs an operation of storing a flag in a nonvolatile memory indicating whether cleaning of each of the plurality of cleaning nozzles is required.

10. A cleaning method to be performed in an automatic analysis device including:
a rotatable reaction disk on which a plurality of reaction cells, in each of which a mixed liquid including a sample and a reagent that are mixed and have been allowed to react, are disposed on a circumference;
a cleaning mechanism including a plurality of cleaning nozzles configured to clean the plurality of reaction cells; and
a control unit, the method comprising:
the control unit controlling the cleaning mechanism and the reaction disk to perform
an operation of lowering one cleaning nozzle of the plurality of cleaning nozzles in the cleaning mechanism toward a first reaction cell of the plurality of reaction cells, and the one cleaning nozzle discharging and accumulating a cleaning liquid or cleaning water into the first reaction cell;
an operation of rotating the reaction disk after the accumulation;
an operation of, after the rotation, lowering another cleaning nozzle of the plurality of cleaning nozzles in the cleaning mechanism toward the first reaction cell without making the another cleaning nozzle draw in the cleaning liquid or cleaning water, and immersing the another cleaning nozzle in the cleaning liquid or cleaning water that is accumulated in the first reaction cell by the one cleaning nozzle, so as to clean the another cleaning nozzle, wherein each of the plurality of cleaning nozzles includes an intake nozzle configured to draw in the cleaning liquid or cleaning water from the first reaction cell and a discharge nozzle disposed in contact with the intake nozzle and configured to discharge the cleaning liquid or cleaning water into the first reaction cell, and a lower end of the intake nozzle extends beyond a lower end of the discharge nozzle, the cleaning liquid is an alkaline cleaning liquid, and wherein the control unit controls the cleaning mechanism and the reaction disk differently based on whether the alkaline cleaning liquid or the cleaning water is being discharged, such that the intake nozzle is disposed inside of the first reaction cell and in contact with a bottom surface of the first reaction cell when discharging of the alkaline cleaning liquid begins and the discharging of the alkaline cleaning liquid continues while the intake nozzle is raised away from the bottom surface until the intake nozzle reaches an overflow intake height of the first reaction cell, and the intake nozzle is disposed inside of the first reaction cell and above the bottom surface of the first reaction cell during discharging of the cleaning water and the intake nozzle is lowered into the first reaction cell and in contact with the bottom surface of the first reaction cell only after the discharging of the cleaning water has been completed.

11. The cleaning method according to claim 10, further comprising an operation of storing a flag in a nonvolatile memory indicating whether cleaning of each of the plurality of cleaning nozzles is required.

* * * * *